US008555253B2

(12) United States Patent
Shufer et al.

(10) Patent No.: US 8,555,253 B2
(45) Date of Patent: Oct. 8, 2013

(54) SYSTEM AND METHOD FOR MONITORING EXPLORATORY TESTING BY A PLURALITY OF TESTERS

(75) Inventors: Ilan Shufer, Tel Aviv (IL); Alexei Ledenev, Nes-Ziona (IL); Yaron Burg, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1010 days.

(21) Appl. No.: 12/611,065

(22) Filed: Nov. 2, 2009

(65) Prior Publication Data

US 2011/0107153 A1    May 5, 2011

(51) Int. Cl.
*G06F 9/44*    (2006.01)
*G06F 15/16*    (2006.01)

(52) U.S. Cl.
USPC ........... 717/125; 717/124; 717/127; 717/131; 717/132; 709/203; 709/205; 709/229

(58) Field of Classification Search
None
See application file for complete search history.

(56) References Cited

U.S. PATENT DOCUMENTS

| | | | |
|---|---|---|---|
| 6,067,639 A * | 5/2000 | Rodrigues et al. | 714/38.11 |
| 6,898,704 B2 * | 5/2005 | Louden et al. | 713/2 |
| 7,010,782 B2 * | 3/2006 | Narayan et al. | 717/124 |
| 7,653,896 B2 * | 1/2010 | Herdeg, III | 717/113 |
| 7,788,642 B2 * | 8/2010 | Sohm et al. | 717/125 |
| 7,933,956 B2 * | 4/2011 | Hon et al. | 709/205 |
| 2006/0053372 A1 * | 3/2006 | Adkins et al. | 715/709 |
| 2008/0010537 A1 * | 1/2008 | Hayutin et al. | 714/38 |
| 2013/0061155 A1 * | 3/2013 | Hon | 715/753 |

\* cited by examiner

*Primary Examiner* — Henry Tsai
*Assistant Examiner* — Michael Sun

(57) ABSTRACT

A system and method for monitoring exploratory testing by a plurality of testers of software containing a graphical user interface is disclosed. The method includes recording interactions of each of the plurality of testers with a graphical user interface (GUI) under test. The recorded interactions of each tester can be stored in an interaction database. An interaction footprint map is created from the interaction database to show which portions of the GUI under test have had interaction with at least one of the testers. The interaction footprint map is displayed in relation to the GUI for at least one end user.

18 Claims, 5 Drawing Sheets

300

| GUI Object | Event Details | Value | Timestamp | Tester ID |
|---|---|---|---|---|
| type='input'<br>name='q'<br>order=1 | Set Value | New York | 10/14/2009 9:50 | Tester #3 |
| type='button'<br>name='btnG' | Right Mouse Click | | 10/14/2009 9:50 | Tester #3 |
| type='link'<br>href='<br>http://en.wikipedia.org/wiki/New_York' | Right Mouse Click | | 10/14/2009 9:50 | Tester #3 |
| type=window<br>title='New York - Wikipedia' | Left Mouse Click | | 10/14/2009 9:50 | Tester #3 |
| type='popup menu item'<br>label='Print' | Right Mouse Click | | 10/14/2009 9:50 | Tester #3 |

FIG. 3

SYSTEM AND METHOD FOR MONITORING EXPLORATORY TESTING BY A PLURALITY OF TESTERS

BACKGROUND

Functional testing of software is typically accomplished through one of three test methods. The first is through the use of designed manual testing. In this method, a test author designs a test that can be performed manually to verify that the software functions as designed and that there are no bugs in the software. A designed manual test can be relatively expensive to create and may be limited by the expertise, creativity, and time budget of the test author. Functional areas not covered by the manual test can still contain errors and bugs.

A second method for functional testing of software is through the design of automated tests. Automated testing can overcome some of the limitations of manual tests by enabling tests to be run a number of times under varying conditions and with different data inputs. This can provide more thorough testing in the same amount of time as a manual test is run. However, automated tests can be even more expensive to author than manual tests, due to their increased complexity. Additionally, automated tests can be limited in much the same way as manual tests, by the expertise, creativity, and time budget of the test author.

A third method for functional testing of software is through exploratory testing. Exploratory testing does not rely on a predefined testing scenario. Rather, one or more software testers merely use the software in an effort to find errors or bugs. Exploratory testing is less expensive than designed testing (either manual or automated) since it does not require the creation of a testing script prior to testing. Exploratory testing can also be more complete than designed tests, especially if multiple different people perform the exploratory testing. The use of multiple testers enables different ideas and points of view to be tested, enabling a more thorough analysis of a new software program.

However, exploratory testing is typically not manageable since there is no advance scripting or review of an executed test case. In addition, there is a high chance of duplicated testing efforts when there is more than one tester, since exploratory testing is not ordered, or accomplished with predefined scenarios. The duplication of efforts can reduce the savings in time and money from creating scripted tests.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3 is an exemplary database containing macros of objects in the GUI under test that are interacted with by a tester in accordance with an embodiment of the present invention.

Figure 1:
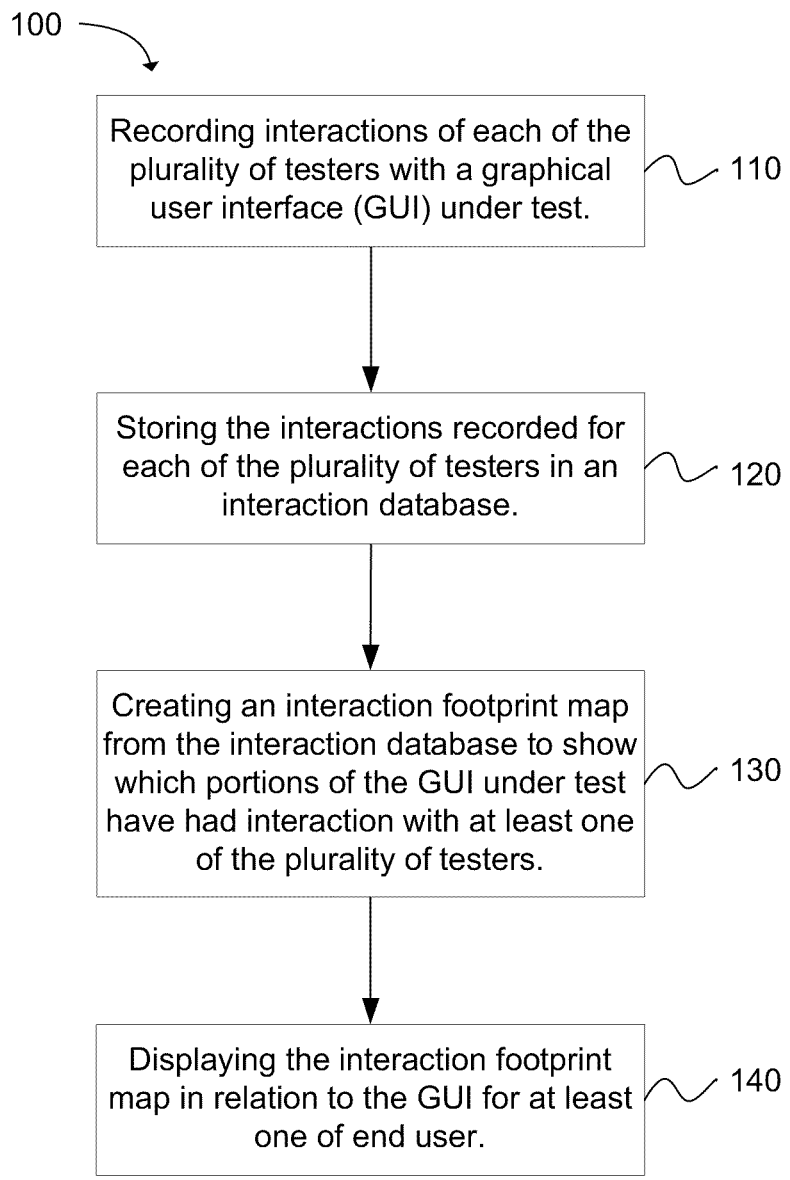
FIG. 1 is depiction of a flow chart of a method for monitoring exploratory testing by a plurality of testers of software containing a graphical user interface in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification are labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

The described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Example Embodiments

Exploratory testing is defined as the testing of a software application using a non-scripted test. As used herein, exploratory testing can include all types of manual, non-scripted tests, including but not limited to acceptance testing, ad-hoc testing, beta testing, black box testing, boundary testing, compatibility testing, concurrency testing, conformance testing, functional testing, gorilla testing, monkey testing, sanity testing, scalability testing, system testing, and so forth.

Exploratory testing of software applications offers many advantages over traditional scripted testing. For example, compared with traditional scripted testing of software applications, exploratory testing can create faster results, provide a better quality of defects discovered in testing, and enable a better usage of each tester's expertise. However, when multiple testers provide collaborated exploratory testing of a software application having a graphical user interface, there can be a large amount of overhead created by a duplication of effort. Exploratory testing is, by definition, substantially spontaneous. While each tester may have some initial thoughts as to how to access a selected application for testing, much of the value from exploratory testing is gained from the tester's ability to access the application in an unfettered manner. If a plurality of testers are each assigned a small portion of the application to test, rather than being able to explore and test the entire application, or a large subsection of the application, then the knowledge that would have been gained through their substantially unfettered access can be diminished.

To reduce the duplication that typically occurs in collaborated exploratory testing, while maintaining the ability of a tester to have substantially unfettered access to test the application, a system and method for monitoring exploratory testing by a plurality of testers of software containing a graphical user interface is disclosed. The method 100 is depicted in the flow chart of FIG. 1. The method includes the operation of recording 110 interactions of each of the plurality of testers with a graphical user interface (GUI) under test.

As used herein the term graphical user interface is intended to refer to a computer software application having a graphical interface. A GUI is a type of user interface item that allows people to interact with a software program in more ways than using a keyboard. For example, the GUI can be an interface having graphical objects that can be interacted with through a mouse, a pointing device such as a stylus or optical pointer, or through touch using a person's fingers. Other methods of interfacing with graphical objects in a user interface are also considered to be within the scope of the present invention. The GUI may be limited to a single display, or may display tens, or even hundreds of different screens with which the testers can interact.

The interactions of each of the testers with the GUI under test can be recorded using a software record engine. Example software record engines include Quick Test Professional (QTP) and Selenium. The software record engine can record each interaction of a tester with a graphical user interface, including data that is entered, buttons that are selected, actions that are taken, parameters that are selected, movement of a pointing device such as a mouse, hyper links that are clicked on, drop down boxes that are accessed, radio buttons that are selected, and so forth. Thus, each interaction of each of the plurality of testers with a GUI can be recorded as a macro, or a series of macros.

In one embodiment, each macro may include three values comprising an object identification, an action taken on the object, and a parameter. For example, when a button in the GUI is clicked, the three values may be Button1, Mouse Click, and Right Click. In another example, when a date is entered, the three values may be DatePicker1, SetDate, and Sep. 19, 1999. When a selection is made from a drop down list, the three values may be: dropdownlist1, Select, and California. The interaction macro can contain sufficient information to enable the actions of the plurality of testers to be recorded and later displayed. This will be discussed in further detail below.

The method 100 further includes the operation of storing 120 the interactions of each of the plurality of testers in an interaction database. In one embodiment, the macro or series of macros can be recorded in the interaction database. These macros can be recorded based on time, tester identification, GUI identification, and so forth. The interaction database can be in communication with each computer used by a tester to test the GUI. An interaction footprint map can be created 130 from the interaction database to show which portions of the GUI under test have had interaction with one or more of the plurality of testers.

The method includes the additional operation of displaying 140 the interaction footprint map in relation to the GUI for at least one end user. The end user can be a tester, a test manager, or another interested party. The interaction footprint map can be displayed in a number of ways in relation to the GUI being tested.

For example, the interaction footprint map can be overlaid on the GUI to show which objects in the GUI have been interacted with. The overlaid map may contain selected colors outlining objects in the GUI that testers have interacted with. Color coding can be used to identify specific testers, the number of testers that interacted with an object, and so forth. In one embodiment, for each accessed object in the GUI, the interaction footprint map can include additional information such as how many testers have accessed the object, which testers have accessed the object, what data values have been entered, which buttons, check boxes, radio buttons, hyper links, and other objects have been accessed, and so forth. The information can also be displayed in 3d, such as in a relief view, to enable the tester to better differentiate between the graphics in the GUI under test and the graphics in the interaction footprint map. Using a graphical display, the interaction footprint map can allow one or more of the testers to visually determine which portions of the GUI under test have been accessed. In one embodiment, each tester can view in substantially real-time which features have been accessed by other testers.

In addition to overlaying a map on the GUI under test, the interaction footprint map can be displayed in other ways. For example, in certain computer languages, such as hyper text meta language (HTML), it is possible to integrate the map by changing the features of objects and adding objects to the GUI under test. This will be discussed more fully below.

Another method of displaying the map is through creating a reduced size copy of the GUI under test screen and integrating the interaction footprint map with the reduced size copy. A tester can then have an original GUI under test that is not cluttered by the map, while still having a visual presentation showing which objects in the GUI have been interacted with. In another embodiment, a tester may show a clean copy of the GUI under test adjacent to a copy of the GUI under test overlaid with the interaction footprint map showing the interaction of one or more of the testers over a selected period of time.

While several examples have been given of methods of displaying the interaction footprint map relative to the GUI under test, these examples should not be considered limiting. A wide variety of methods can be used to associate graphical information related to the interaction database with the associated objects in the GUI under test. The interaction footprint map is a graphical illustration that enables a tester or supervisor to determine which objects have been interacted with by a tester during a collaborative exploratory test of the GUI. Any method of associating the information contained in the interaction footprint map with the GUI under test is considered to be within the scope of the present application.

In another embodiment, previously run tests can also be stored in the interaction database. Rather than viewing tests in substantially real-time, a tester can select and access tests stored in the interaction database that were previously conducted and display the information in the interaction footprint map as previously discussed. The tester can select previously run tests for a particular GUI based on a selected time period, the identity of one or more desired testers, or other limiting information to obtain an interaction footprint map that contains the desired information.

Figure 2A:
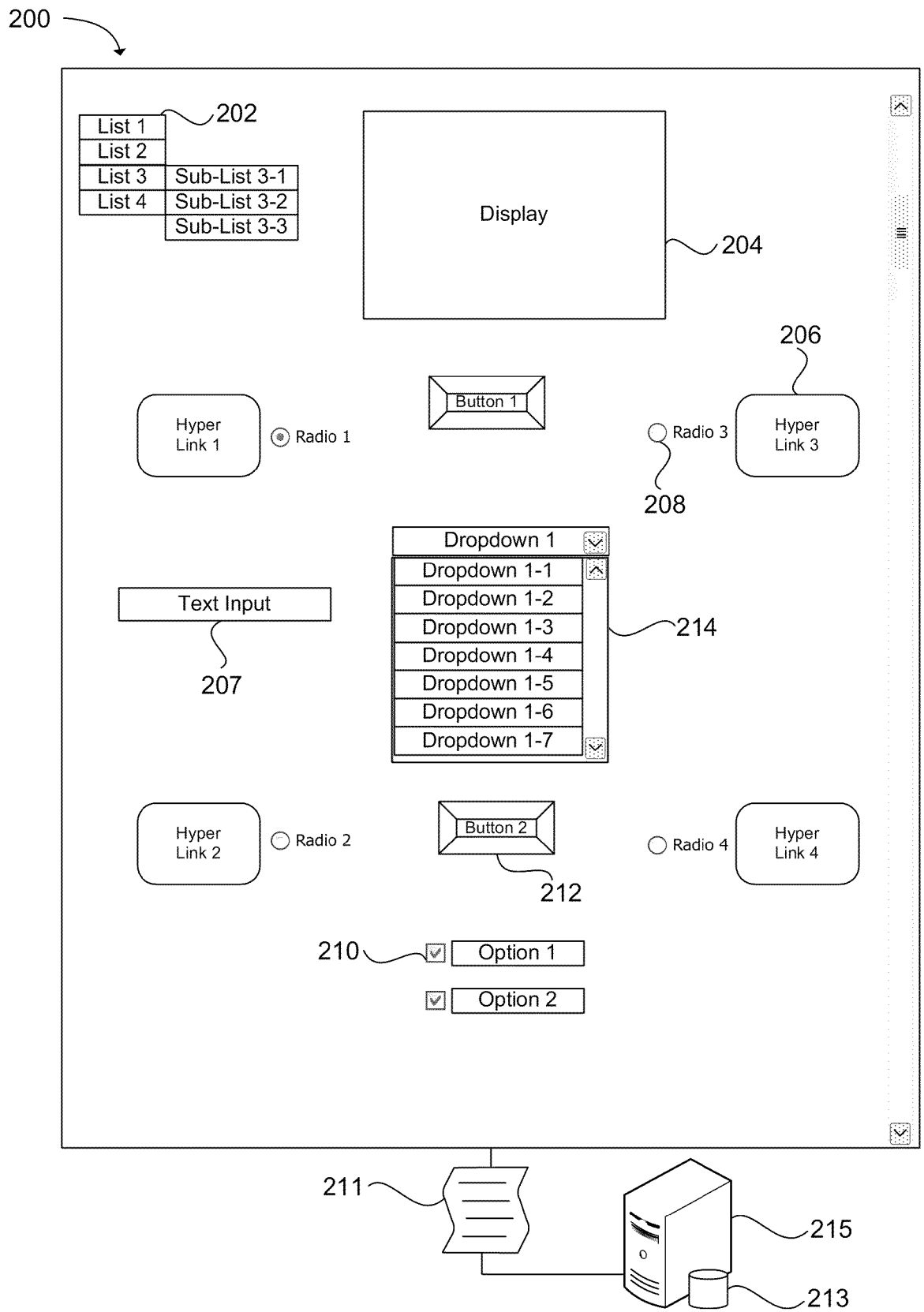
FIG. 2a is an illustration of an example of a software application having a graphical user interface that may be tested using collaborated exploratory testing by a plurality of testers in accordance with an embodiment of the present invention.

FIG. 2a shows an example of a software application having a graphical user interface 200 that may be tested using collaborated exploratory testing by a plurality of testers. The GUI can include a number of different types of objects, such as, but not limited to, a pop-out list 202, a graphic or text display 204, a plurality of hyper links 206, a text input box 207, radio buttons 208, check boxes 210, buttons 212, drop down lists 214, ribbons (not shown), and so forth.

As a plurality of testers interact with the GUI 200 to perform testing, each interaction with each object in the GUI is recorded as a script 211 containing a macro, or series of macros. The script can be recorded in a scripting language, such as HTML, or another type of computer language capable of recording the user's interactions. The script 211 can be stored in a database 213 located on a server 215. Each macro can include information such as the type of object that a tester interacted with. Depending on the type of object, the macro can also include a value entered in the object (such as a number or string), whether the object was clicked on or selected, the name of the tester that interacted with the object, the time at which the tester interacted with the object, and so forth.

Figure 2B:
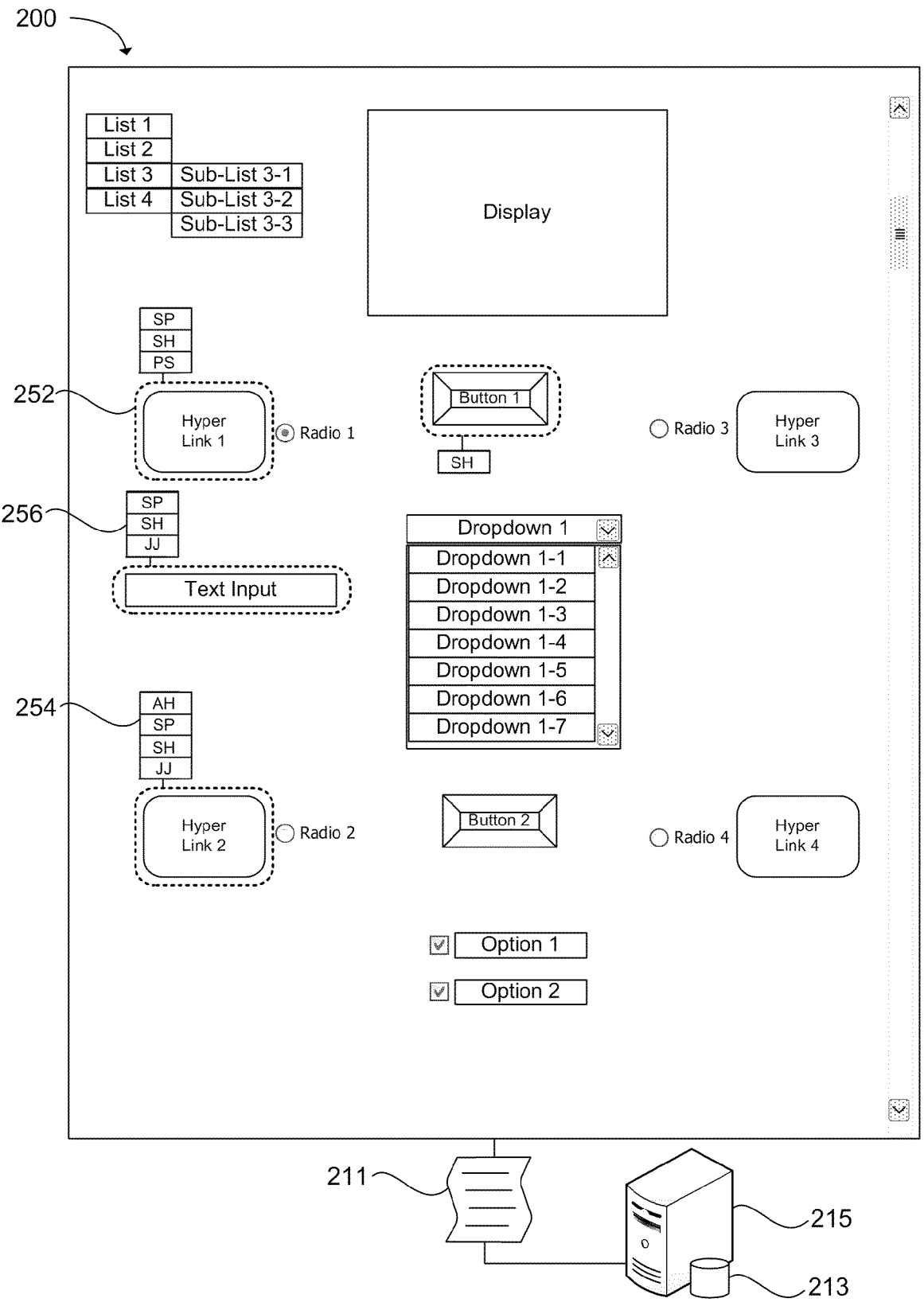
FIG. 2b is an illustration of an interaction footprint map in relation to the graphical user interface of FIG. 2a in accordance with an embodiment of the present invention.

FIG. 2b shows the GUI under test 200 displayed in relation with the interaction footprint map, represented in this example by dashed lines surrounding objects that were interacted with by various testers. In this example, the interaction footprint map shows a ring of dashed lines 252 around Hyper Link 1, representing that it has been interacted with by at least one tester. The ring may be coded to represent additional information using color, line pattern, line thickness, or so forth. Additional information can also be presented adjacent to the object, such as bar charts, pie charts, or other graphical information. For example, in FIG. 2b, an identification box 252 that shows the initials of each tester that interacted with Hyper Link 1 is shown adjacent to the object. The identification box shows that testers SP, SH, and PS have interacted with the hyper link. If one or more of the testers detects a failure or flaw in the software application associated with the GUI under test 200, they can contact the other testers that also accessed Hyper Link 1 to determine whether they detected a similar defect.

The identification box 254 can also contain additional information. In one embodiment, a tester or supervisor can click on the identification box to obtain an expanded graphic containing the additional information. Alternatively, the identification box may include a hyper link that leads to more information on a separate page. For example, when a tester mousses over selected initials, information can be displayed that shows when the tester interacted with the object, whether an error was detected, and what objects were selected by the tester prior to and after Hyper Link 1 was selected. Such information can be important in determining what series of steps led to a certain type of failure.

FIG. 2b also shows that Button 1 was interacted with by tester SH, Hyper Link 2 was interacted with by testers AH, SP, SH, and JJ, and the Text Input box was interacted with by testers SP, SH, and JJ. When a user mouses over the initials of a tester listed in the identification box 256, a graphic or text information can be displayed showing the value entered into the text box by each tester. This enables follow-on testers to enter additional values that can further test the software application associated with the GUI under test. For example, a tester may see that typical values have been entered, such as a small number, a name, or an address. The follow-on tester can try large numbers, negative numbers, zero, or lengthy text fields to identify whether the text input performs as designed with the overall application. As each tester interacts with the GUI under test, the interactions can continue to be recorded as macros in the script 211 that is saved in the database 213 on the server 215.

The interactions of each tester with the GUI under test 200 can be displayed in near real-time, as previously discussed. The interaction footprint map can be turned on or off by the tester. For example, a tester may initially turn the map on to see which areas have previously been tested and interacted with. The tester may then turn the map off as he or she interacts with the GUI under test.

In another embodiment, an interaction footprint map can be created and displayed in relation to the GUI under test for a selected period of time, or for selected testers. For example, a test supervisor can review the results of a day's testing. He can identify, from information saved in the database 213, that a number of errors occurred in a short period of time, from around 2:00 PM to 2:30 PM, based on the inputs of three testers. The supervisor can load an interaction footprint map based on the macros in the database 213 that have a time stamp from 1:55 PM to 2:35 PM to view the interaction footprint map containing the interactions of the three testers during this time period. This can eliminate clutter from the interaction footprint map that may not be associated with the errors. The supervisor can then review the actions taken by the three testers to more clearly determine what may have caused the errors.

One example of a database 300 is shown in FIG. 3. Each entry in the database is a macro that is recorded based on the interaction of a tester with the GUI under test. The interaction can be recorded using a software record engine, as previously discussed. Each macro can include a unique identifier for the GUI object, the event details, an optional value for the object, a timestamp identifying the time at which the object was interacted with, and an identification of the tester. This information can then be used to form the interaction footprint map showing which objects in the GUI under test have been interacted with. The interaction footprint map constructed from the information in the database can be limited based on a selected time period and selected testers.

Figure 4:
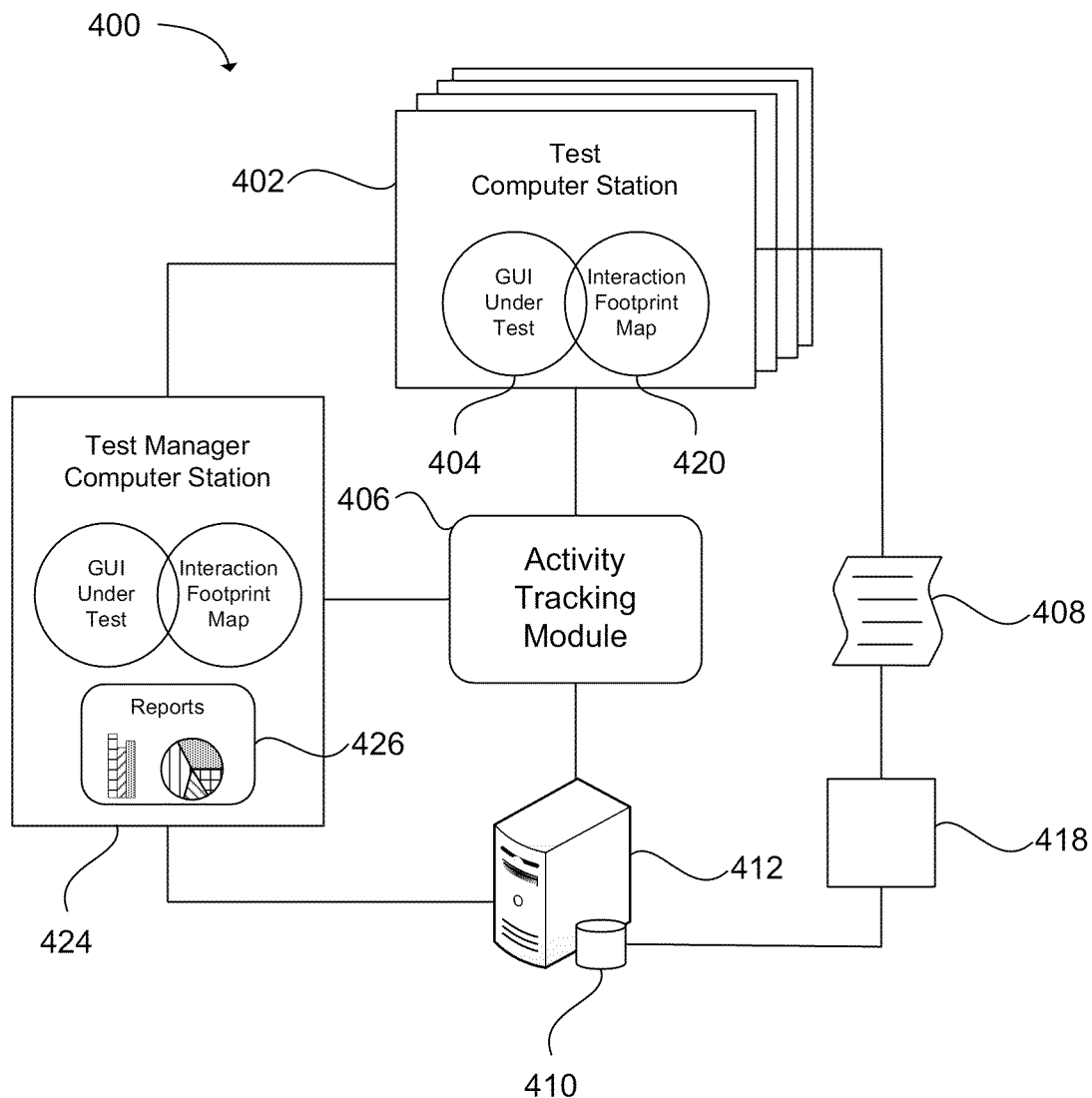
FIG. 4 is an illustration of a block diagram of a system for monitoring exploratory testing by a plurality of testers of software containing a graphical user interface in accordance with an embodiment of the present invention.

FIG. 4 shows an illustration of an example of a system 400 for monitoring exploratory testing by a plurality of testers of software containing a graphical user interface. The system comprises a plurality of test computer stations 402 to enable the plurality of testers to perform exploratory testing on a graphical user interface (GUI) under test 404. The plurality of test computer stations may run on the same operating system. Alternatively, the test computer stations can run on a variety of different operating systems to enable testing of an application having a GUI on the different operating systems.

An activity tracking module 406 is configured to detect interactions of the plurality of testers with each object interacted with in the GUI under test. The activity tracking module may be located on each test computer station 402, 424. Alternatively, the activity tracking module may be located at the server 412. The activity tracking module can create an interaction macro 408 for each object with which a tester interacts with in the GUI under test 404. Alternatively, the activity tracking module may monitor the interaction macros stored in the database 410. In one embodiment, the interaction macro can comprise an object identification, an action taken on the object, and a parameter, as previously discussed. The interaction macro can contain sufficient information to enable the actions of the plurality of testers to be recorded.

The system further comprises an interaction database 410 located on a server 412 that is in communication with the plurality of test computer stations 402 and the test manager computer station 424. Each test computer station may be a computer connected to the server 412. Alternatively, the test computer stations can be a dumb terminal configured to interact with the database 410 on the server 412. The interaction database 410 is configured to store each interaction macro 408 for the objects interacted with in the GUI under test 404 by the plurality of testers.

A graphical interaction footprint map 420 is created to show which objects in the GUI under test 404 have had interaction with at least one of the plurality of testers based on the interaction macros 408 stored in the interaction database 410. The graphical interaction footprint map 420 is configured to be displayed in relation to the GUI under test 404. As previously discussed, the graphical footprint map may be formed by hooking in to the engine running the GUI under test and altering a view of the object. For example, an object may be highlighted with a specific color based on the identity of the tester, or the number of testers that interacted with the object. The object can be altered using the attributes of the object identified in the object API, such as the document object model in HTML. The engine running the GUI may be based on HTML, .NET, Java, SAP, Web, and other technologies, as can be appreciated. Any type of change to the object, such as color, texture, size, and so forth, may be made that allows the testers to accurately determine which objects have been previously interacted with. When the object API is accessible, such as in HTML based applications, the objects in the GUI under test can be altered or amended by adding to or altering the code of the HTML application, as can be appreciated. Thus, the interaction footprint map 420 can be embedded in the GUI under test.

In situations where the object API of the GUI under test 404 is not accessible, the interaction footprint map 420 can form a graphical overlay that paints or otherwise outlines an object that a tester has interacted with. In this embodiment, the interaction footprint map 420 is not a part of the GUI under test, but merely a graphical overlay aligned with the GUI under test to graphically illustrate the objects that are interacted with. As previously discussed, the overlay can include additional data, such as the values that have been selected or entered, the number of testers that have interacted with an object, the time of the interaction, the actions taken before and after, and so forth.

A test manager computer station 424 can be configured to view the GUI under test 404 and the interaction footprint map 420, either in near real-time or after the testing has been completed based on the data contained in the interaction database 410 located on the server 412. The test management computer station 424 can visually show the coverage of the testing using the interaction footprint map. Various reports 426 can also be created and accessed by the test manager to review and confirm that adequate testing has been performed through the exploratory testing of the plurality of testers. The manager can also use the interaction macros 408 recorded in the interaction database 410 to create an accurate test case of the exact steps of a tester (i.e. the tester's actions and data entry) to reproduce a selected failure or success. In addition, a video recording can be made of the tester's interactions with the GUI under test during the exploratory test. The video recording can be used to fully document the exploratory testing done by the tester.

In another embodiment, a system is disclosed that comprises one or more processors and one or more computer readable media. Computer readable instructions on the one or more computer readable media can, when executed by the one or more processors, cause the one or more processors to implement a method for monitoring exploratory testing by a plurality of testers of software containing a graphical user interface. The method includes the operation of creating an interaction macro for each object interacted with by interactions of the plurality of testers with a graphical user interface (GUI) under test. The interaction macros for each of the plurality of testers are stored in an interaction database that is coupled to a plurality of test stations used by the plurality of testers to interact with the GUI under test. An interaction footprint map is created from the interaction database to show which portions of the GUI under test have had interaction with at least one of the plurality of testers. The interaction footprint map is displayed in relation to the GUI under test on at least one of the plurality of test stations for at least one end user to view.

In one example embodiment, ten testers can be called up for an exploratory/ad-hoc testing process of a GUI under test 404. A test manager can assign each tester to a test computer station 402. Each test computer station can be configured to work with the activity tracking module 406 to record interaction macros 408 for each object interacted with by the tester, and to save the interaction macros in the interaction database 410 on the server 412.

In an example, once the testing has started, Tester #3 may arrive at a screen/business process and fail to intuitively find any software defects. Tester #3 can invoke the interaction footprint map 420 to make it viewable in relation to the GUI under test 404 to determine which areas of the GUI under test have been interacted with by the other testers and what data has previously been entered. Tester #3 may identify that in a drop down box labeled "country", that either the first or the second country has always been selected by the other testers, while selecting the other possible countries in the drop down box have not been tried. While choosing different data sets and interacting with the previously untouched user interface widgets, such as a check box, the tester may identify a new software defect.

Tester #3 can invoke a test case reproducer module 418 that shows the previous interaction macros for the tester. The tester can select the relevant macros that lead up to the new software defect and document the defect. Two hours later, the Test Manager can identify at the test manager computer station 424, that Testers 4-7 are also focusing on the same screen and business processes that Tester #3 had previously interacted with. The test manager may also determine that a different area in the GUI under test has been neglected. Therefore, the test manager can direct testers 4-7 to different application areas to assure wider coverage.

Collaborative exploratory testing conducted by a plurality of testers can provide many advantages over scripted tests. The creation and use of an interaction footprint map showing the interaction of each tester with the GUI can help to minimize duplicated efforts and maximize testing coverage area across the GUI under test application, while maintaining the ability of each exploratory tester to interact with the GUI under test in a substantially unhindered fashion, thereby maintaining the creative benefits of using exploratory testing of an application.

While the forgoing examples are illustrative of the principles of the present invention in one or more particular applications, it will be apparent to those of ordinary skill in the art that numerous modifications in form, usage, and details of implementation can be made without the exercise of inventive faculty, and without departing from the principles and concepts of the invention. Accordingly, it is not intended that the invention be limited, except as by the claims set forth below.

What is claimed is:

1. A method for monitoring exploratory testing by a plurality of testers of software containing a graphical user interface, comprising:
    recording interactions of each of the plurality of testers with a graphical user interface (GUI) under test;
    storing the interactions recorded for each of the plurality of testers in an interaction database;
    creating an interaction footprint map from the interaction database to show which portions of the GUI under test have had interaction with at least one of the plurality of testers; and
    displaying the interaction footprint map in relation to the GUI for at least one end user by overlaying the interaction footprint map on the GUI under test to graphically identify which objects have had interaction with at least one of the plurality of testers based on the interactions recorded in the interaction database.

2. The method of claim 1, wherein recording the interactions of each of the plurality of testers further comprises recording a function of each object with which each tester interacts based on an object API of the GUI under test.

3. The method of claim 1, wherein recording the interactions of each of the plurality of testers further comprises recording a macro for each object interacted with by at least one of the plurality of testers, wherein the macro comprises an object identification, an action taken on the object, and a parameter.

4. The method of claim 3, wherein recording a macro for each object further comprises storing the macros of each of the plurality of testers in the interaction database, wherein the interaction database is located on a network server accessible by each of the plurality of testers.

5. The method of claim 1, wherein creating the interaction footprint map further comprises providing an action to enable each tester to make the interaction footprint map visible with relation to the GUI under test.

6. The method of claim 1, wherein creating the interaction footprint map further comprises creating the interaction footprint map from a selected portion of the interaction database selected from a group consisting of a portion based on a period of time and a portion based on at least one tester selected from the plurality of testers.

7. The method of claim 1, wherein creating the interaction footprint map further comprises hooking into an engine running the GUI under test to alter properties of selected objects in the GUI under test which have been interacted with by at least one of the plurality of testers to enable the at least one tester to determine which objects have been interacted with.

8. The method of claim 1, wherein creating the interaction footprint map from the interaction database further comprises providing additional graphical information for each object having interaction with at least one of the testers, wherein the additional graphical information is selected from a group consisting of when the tester interacted with a selected object, whether an error was detected with the selected object, and what objects were selected by the tester prior to and after the selected object was selected.

9. The method of claim 1, wherein displaying the interaction footprint map further comprises highlighting selected objects in the GUI under test a selected color based on an identity of the tester that interacted with the selected object.

10. The method of claim 1, wherein displaying the interaction footprint map further comprises highlighting objects in the GUI under test which have been interacted with by at least two of the plurality of testers in a selected manner to enable the plurality of testers to determine which objects have had interactions with the plurality of testers.

11. The method of claim 1, wherein displaying the interaction footprint map further comprises displaying a reduced size copy of the GUI under test in relation with the interaction footprint map to enable a tester to view both the reduced size copy and the original GUI under test to determine which objects have been previously interacted with.

12. The method of claim 1, wherein displaying the interaction footprint map further comprises displaying the interaction footprint map in relation to the GUI under test, wherein the at least one end user is at least one of the plurality of testers and at least one testing supervisor.

13. The method of claim 1, further comprising displaying the interaction footprint map in relation to the GUI under test for each of the plurality of testers in substantially real-time.

14. The method of claim 1, further comprising displaying the interaction footprint map in relation to the GUI under test for a test manager and providing reports for the test manager regarding the recorded interactions of the plurality of testers.

15. A system to monitor exploratory tests by a plurality of testers of software containing a graphical user interface, comprising:
    a plurality of test computer stations to enable the plurality of testers to perform exploratory tests on a graphical user interface (GUI) under test;
    an activity track module to detect interactions of the plurality of testers with each object interacted with in the GUI under test and record an interaction macro comprising an object identification, an action taken on the object, and a parameter;
    an interaction database located on a server in communication with the plurality of test computer stations, the interaction database to store each interaction macro for the objects interacted with in the GUI under test by the plurality of testers; and
    a graphical interaction footprint map that shows which objects in the GUI under test have had interaction with at least one of the plurality of testers based on the interaction macros stored in the interaction database, wherein the graphical interaction footprint map is displayed in relation to the GUI under test by overlay of the interaction footprint map on the GUI under test to graphically identify which objects have had interaction with at least one of the plurality of testers based on the interactions recorded in the interaction database.

16. The system as in claim 15, further comprising a test case reproducer module that shows previous interaction macros for the tester to enable a selected number of interactions to be reproduced in an order recorded in the interaction database to allow a test to be reproduced.

17. A system comprising:
one or more processors;
one or more non-transitory computer readable media:
computer readable instructions on the one or more non-transitory computer readable media which, when executed by the one or more processors, cause the one or more processors to monitor exploratory tests by a plurality of testers of software containing a graphical user interface, comprising:

create an interaction macro for each object interacted with by interactions of the plurality of testers with a graphical user interface (GUI) under test;
store the interaction macros for each of the plurality of testers in an interaction database coupled to a plurality of test stations used by the plurality of testers to interact with the GUI under test;
create an interaction footprint map from the interaction database to show which portions of the GUI under test have had interaction with at least one of the plurality of testers; and
display the interaction footprint map in relation to the GUI under test on at least one of the plurality of test stations for at least one end user by overlay of the interaction footprint map on the GUI under test to graphically identify which objects have had interaction with at least one of the plurality of testers based on the interaction macros stored in the interaction database.

18. The system of claim 17, further comprising create the interaction macro for each object interacted with by use of information in an object API of the GUI under test.

* * * * *